(12) United States Patent
Shu et al.

(10) Patent No.: US 12,337,473 B2
(45) Date of Patent: Jun. 24, 2025

(54) METHOD AND MECHANICAL DESIGN OF A FLEXURE INTERFACE FOR ULTRA-HIGH-VACUUM NANOPOSITIONING Invar BASE NEAR-ZERO-LENGTH FEEDTHROUGH

(71) Applicant: UChicago Argonne, LLC, Chicago, IL (US)

(72) Inventors: Deming Shu, Darien, IL (US); Steven P. Kearney, Schaumberg, IL (US); Jayson W. Anton, Chicago, IL (US); William F. Toter, Park Ridge, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1046 days.

(21) Appl. No.: 17/346,537

(22) Filed: Jun. 14, 2021

(65) Prior Publication Data
US 2022/0399137 A1    Dec. 15, 2022

(51) Int. Cl.
| | | |
|---|---|---|
| *G21K 1/06* | (2006.01) | |
| *B25J 7/00* | (2006.01) | |
| *G01N 23/20025* | (2018.01) | |
| *H05H 7/14* | (2006.01) | |

(52) U.S. Cl.
CPC .......... *B25J 7/00* (2013.01); *G01N 23/20025* (2013.01); *H05H 7/14* (2013.01); *G01N 2223/321* (2013.01); *G21K 1/06* (2013.01)

(58) Field of Classification Search
CPC ................ B25J 7/00; G01N 2223/321; G01N 23/20025; G21K 1/06; G21K 2201/067; H05H 7/14
See application file for complete search history.

(56) References Cited

U.S. PATENT DOCUMENTS

| | | | | |
|---|---|---|---|---|
| 4,575,853 A | * | 3/1986 | Jako | ...................... H01S 3/0305 |
| | | | | 372/98 |
| 4,903,937 A | * | 2/1990 | Jakubiec | ................. F16K 51/02 |
| | | | | 251/169 |
| 5,526,903 A | | 6/1996 | Shu et al. | |
| 5,896,200 A | | 4/1999 | Shu et al. | |
| 6,607,840 B2 | | 8/2003 | Shu et al. | |
| 6,822,733 B1 | | 11/2004 | Shu | |
| 6,984,335 B2 | | 1/2006 | Shu et al. | |
| 7,162,888 B2 | | 1/2007 | Shu et al. | |
| 7,331,714 B2 | | 2/2008 | Shu et al. | |
| 7,597,475 B1 | | 10/2009 | Shu et al. | |
| 7,994,688 B2 | | 8/2011 | Shu et al. | |
| 8,089,199 B2 | | 1/2012 | Shu et al. | |

(Continued)

*Primary Examiner* — David P Porta
*Assistant Examiner* — Miya Downing
(74) *Attorney, Agent, or Firm* — Joan Pennington

(57) ABSTRACT

A method and a novel flexure interface apparatus are provided for ultrahigh-vacuum (UHV) applications for precision nanopositioning systems. An ultrahigh-vacuum (UHV) metrology base is integrated with an ultrahigh-vacuum (UHV) flange together including a precision and compact flexure interface structure defining a UHV metrology base near-zero-length feedthrough. The UHV metrology base is directly mounted to a flange mounting surface in air with nanopositioning and thermal stability. The precision and compact flexure interface structure has sufficient strength to hold the vacuum force and sufficiently flexible to survive with the thermal expansion stress during bakeout process.

20 Claims, 14 Drawing Sheets

(56) References Cited

U.S. PATENT DOCUMENTS

| | | |
|---|---|---|
| 9,008,272 B2 | 4/2015 | Shu et al. |
| 9,613,629 B2 | 4/2017 | Shu et al. |
| 9,957,576 B2 | 5/2018 | Weissman et al. |
| 9,966,161 B2 | 5/2018 | Shu et al. |
| 10,663,040 B2 | 5/2020 | Shu et al. |

* cited by examiner

510

100

120

METHOD AND MECHANICAL DESIGN OF A FLEXURE INTERFACE FOR ULTRA-HIGH-VACUUM NANOPOSITIONING Invar BASE NEAR-ZERO-LENGTH FEEDTHROUGH

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE BACKGROUND OF THE INVENTION

The present invention relates generally to precision nanopositioning systems, and more particularly, relates to a method and mechanical design of a flexure interface for ultra-high-vacuum (UHV) applications for precision nanopositioning systems with nanopositioning Invar base near-zero-length feedthrough.

DESCRIPTION OF THE BACKGROUND OF THE INVENTION

Nanopositioning techniques present an important capability to support state-of-the-art research for the Advanced Photon Source (APS) operations at Argonne National Laboratory (ANL). APS has equipped laboratories for nanopositioning devices assembly and characterization. Many state-of-the-art x-ray optics, such as hard x-ray self-seeding monochromator at the Linac Coherent Light Source (LCLS) at Stanford Linear Accelerator Center (SLAC) National Accelerator Laboratory, hard X-ray free electron laser oscillators, cavity-based X-ray free-electron laser (CBXFEL) applications, and state-of-the-art synchrotron radiation instrument applications require repeatable, stable and very high reproducibility for multidimensional linear positioning systems, for example, with nanometer resolution or nanopositioning.

U.S. Pat. No. 10,663,040, issued May 8, 2018 to Deming Shu, Barry Lai, Steven P. Kearney, Jayson W. Anton, Wenjun Liu, Jorg M. Maser, Christian Roehrig, and Jonathan Z Tischler, discloses an enhanced method and precision nanopositioning apparatus for implementing enhanced nanopositioning performance. The nanopositioning apparatus includes a vertical linear nanopositioning flexure stage and a horizontal linear nanopositioning flexure stage. The vertical linear nanopositioning flexure stage includes a stage base, a symmetrically configured flexure linear guiding mechanism with precision motion enhancement structure, and a stage carriage. The horizontal linear nanopositioning flexure stage is mounted on the stage carriage of the vertical linear nanopositioning flexure stage and includes a middle-bar relative position control mechanism to enhance the stiffness of a flexure linear guiding mechanism.

U.S. Pat. No. 9,966,161, issued May 8, 2018 to Deming Shu, Yury V. Shvydko, Stanislav Stoupin, and Kwang-Je Kim, discloses a method and mechanical design for a thin-film diamond crystal mounting apparatus for coherence preservation x-ray optics with optimized thermal contact and minimized crystal strain. The novel thin-film diamond crystal mounting apparatus mounts a thin-film diamond crystal supported by a thick chemical vapor deposition (CVD) diamond film spacer with a thickness slightly thicker than the thin-film diamond crystal, and two groups of thin film thermal conductors, such as thin CVD diamond film thermal conductor groups separated by the thick CVD diamond spacer. The two groups of thin CVD film thermal conductors provide thermal conducting interface media with the thin-film diamond crystal. A piezoelectric actuator is integrated into a flexural clamping mechanism generating clamping force from zero to an optimal level.

U.S. Pat. No. 8,957,567 issued Feb. 17, 2015 to Deming Shu, Steven P. Kearney, and Curt A. Preissner, discloses a method and deformation compensated flexural pivots structured for precision linear nanopositioning stages. A deformation-compensated flexural linear guiding mechanism includes a basic parallel mechanism including a U-shaped member and a pair of parallel bars linked to respective pairs of I-link bars and each of the I-bars coupled by a respective pair of flexural pivots. The basic parallel mechanism includes substantially evenly distributed flexural pivots minimizing center shift dynamic errors.

U.S. Pat. No. 7,994,688 by Deming Shu and Jorg M. Maser and assigned to the present assignee discloses a novel mechanical design for laminar weak-link mechanisms with centimeter-level travel range and sub-nanometer positioning resolution. An enhanced mechanical design for laminar weak-link mechanisms is provided with centimeter-level travel range and sub-nanometer positioning resolution. A multiple parallelogram weak-link structure includes a predefined pattern of a plurality of perpendicularly arranged groups of connecting links, each link having at least one pair of weak-link connections. Each of the plurality of perpendicularly arranged groups includes a terminal for mounting to a fixed base. The multiple parallelogram weak-link structure includes a moving part for mounting on a carriage, providing precisely controlled movement with stability in one direction. A two-dimensional (2D) ultra-precision scanning stages assembly for x-ray nanoprobe applications includes multiple redundantly constrained weak-link structures, a vertical ultra-precision positioning stage, and a horizontal ultra-precision positioning stage.

A continuing need exists for effectively supporting mechanical metrology requirements to enable world class performance of nanopositioning instruments. A continuing need exists to meet integrated nanopositioning requirements and vacuum requirements, for example, to be applied on a diamond crystal nanopositioning station for cavity-based X-ray free electron laser application with multiple UHV nanopositioning stations.

It is desirable to provide a method and mechanical design for a flexure interface apparatus for ultra-high-vacuum (UHV) applications for precision nanopositioning systems.

BRIEF SUMMARY OF THE INVENTION

Principal aspects of the present invention are to provide a method and mechanical design of a flexure interface apparatus for ultra-high-vacuum (UHV) applications for precision nanopositioning systems. Other important aspects of the present invention are to provide such method and mechanical design of such flexure interface apparatus substantially without negative effect and that overcome some of the disadvantages of prior art arrangements.

In brief, a method and a novel flexure interface apparatus are provided for ultrahigh-vacuum (UHV) applications for precision nanopositioning systems. An ultrahigh-vacuum (UHV) metrology base is integrated with an ultrahigh-vacuum (UHV) flange together including a precision and compact flexure interface structure defining a UHV metrology base near-zero-length feedthrough. The UHV metrology base is directly mounted to a flange mounting surface in air with nanopositioning and thermal stability. The precision and compact flexure interface structure has sufficient strength to hold the vacuum force and sufficiently flexible to survive with the thermal expansion stress during bakeout process.

In accordance with features of the invention, the precision and compact flexure interface structure is sufficiently flexible to survive with the thermal expansion stress during ultrahigh-vacuum (UHV) bakeout process for example with 80-100 degrees Celsius for UHV preparation.

In accordance with features of the invention, the UHV metrology base is formed of a nickel-iron alloy with a low coefficient of thermal expansion (CTE or α). The nickel-iron alloy can be subjected to a wide range of temperatures, and preferable is a fully annealed material that can be easily machined and formed and can be welded to a stainless-steel material using various welding processes. For example, the UHV metrology base is formed of an Invar material also known generically as FeNi36 (Invar 36) or 64FeNi in the US, having a uniquely low coefficient of thermal expansion (CTE) or contraction with temperature changes.

In accordance with features of the invention, the ultra-high-vacuum flange is formed of a type of steel alloy, such as a stainless-steel material having high levels of strength and hardness, corrosion resistance, enhanced formability, and machinability. The ultra-high-vacuum flange is formed of a stainless-steel material including alloy types known as 304 L or 17-4 PH, which is formed of approximately: 304 L (18-20% chromium and 8-1.5% nickel) and 17-4 PH (17% chromium and 4% nickel) and can be heat treated to high levels of strength and hardness, and features excellent formability, corrosion resistance and machinability. The ultra-high-vacuum flange includes a groove that has a knife edge, which cuts into a softer metal gasket, for providing an extremely leak-tight, ultrahigh-vacuum seal.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and a flexure interface apparatus are provided for ultrahigh-vacuum (UHV) applications for precision nanopositioning systems. An ultrahigh-vacuum (UHV) Invar metrology base is integrated with an ultra-high-vacuum (UHV) flange together providing a precision and compact flexure interface structure defining a UHV metrology base near-zero-length feedthrough. The UHV metrology base is directly mounted to a UHV flange mounting surface in air, providing nanopositioning and thermal stability. The precision and compact flexure interface structure defining the UHV metrology base near-zero-length feedthrough has sufficient strength to hold ultrahigh-vacuum force and sufficiently flexible to survive with the thermal expansion stress incurred during a bakeout process for various UHV applications, for example during an 80-100 degree Celsius bakeout process.

Figure 1A:
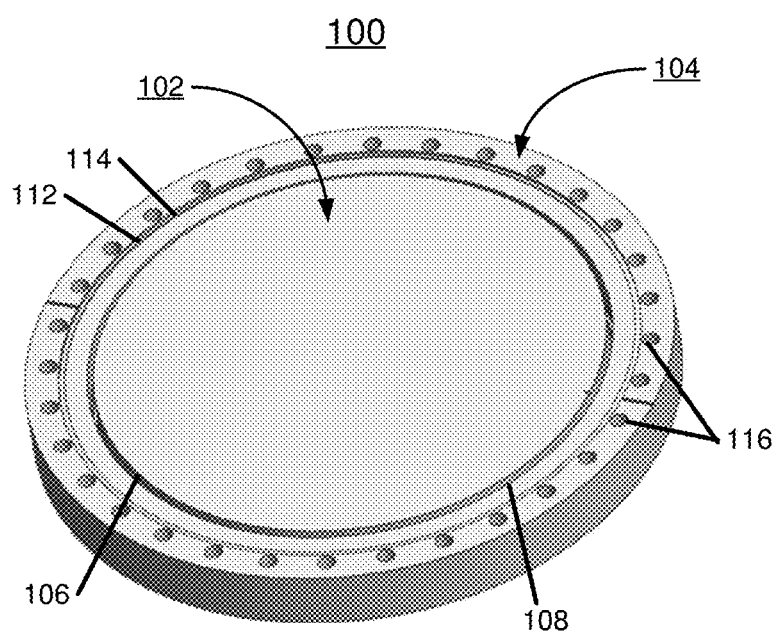
FIGS. 1A and 1B are perspective views of a vacuum or interior side and an air or exterior side respectively illustrating a flexure interface apparatus defining a UHV metrology base near-zero-length feedthrough for ultra-high-vacuum (UHV) applications precision with nanopositioning systems in accordance with a preferred embodiment.
Figure 1B:
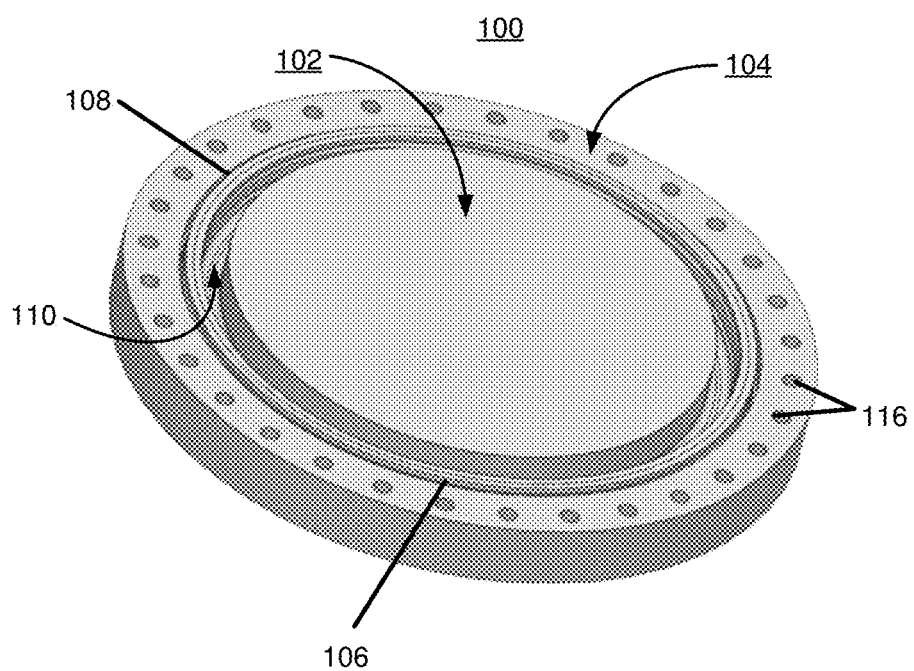

Having reference now to the drawings, in FIGS. 1A and 1B, there is shown an integrated flexure interface apparatus generally designated by the reference character 100 for ultrahigh-vacuum (UHV) applications for precision nanopositioning systems. The flexure interface apparatus 100 includes an ultrahigh-vacuum (UHV) metrology base generally designated by the reference character 102 integrated with an UHV flange generally designated by the reference character 104 in accordance with a preferred embodiment. FIG. 1A illustrates a vacuum side of the UHV metrology base 102 and UHV flange 104. FIG. 1B illustrates an air or exterior side of the UHV metrology base 102 and UHV flange 104 combination.

The UHV metrology base 102 is formed of a nickel-iron alloy with a low coefficient of thermal expansion (CTE or α). The nickel-iron alloy base 102 can be subjected to a wide range of temperatures, and preferable is a fully annealed material that can be easily machined and formed. For example, preferably the UHV metrology base 102 is formed of an Invar material also known generically as FeNi36 (64FeNi in the US), having a uniquely low coefficient of thermal expansion (CTE) or contraction with temperature changes. The UHV Invar metrology base 102 can be welded to a stainless-steel material using various welding processes, including electron-beam weld.

The UHV flange 104 is formed of a type of steel alloy, preferably such as a stainless-steel material having high levels of strength and hardness, corrosion resistance, enhanced formability, and machinability. The UHV flange 104 is formed of a selected stainless-steel material, such as a SS 304 UHV material, and optionally including a separate flexure interface integrated with the SS 304 UHV flange, as illustrated, and described with respect to 8A, 8B, and 8C. The separate flexure interface integrated with the SS 304 UHV flange 104 preferable is an alloy type known as 17-04 PH flexure interface or an Inconel-600 flexure interface. The flexure interface 17-04 PH alloy is formed of approximately 17% chromium and 4% nickel and can be heat treated to high levels of strength and hardness, and features excellent formability, corrosion resistance and machinability.

The UHV metrology base 102 includes a UHV metrology base edge surface 106 received within the central opening 108 of the UHV flange 104. On the air base side shown in FIG. 1B, and best seen in FIGS. 2A, and 2B, a groove or slot 110 extends around the UHV metrology base 102 near the UHV metrology base outer edge 106. A narrow groove 112 is provided around the UHV flange 104 with a machined CF flange knife-edge 114 below the flange outer flat surface. A softer metal alloy gasket (not shown) received in the groove 112 is engaged by the machined CF flange knife-edge 114 forming an effective leak-tight vacuum seal. The UHV flange 104 includes a plurality of openings 116 receiving bolts (not shown) for tightening with a flange-pair (not shown).

Figure 2A:
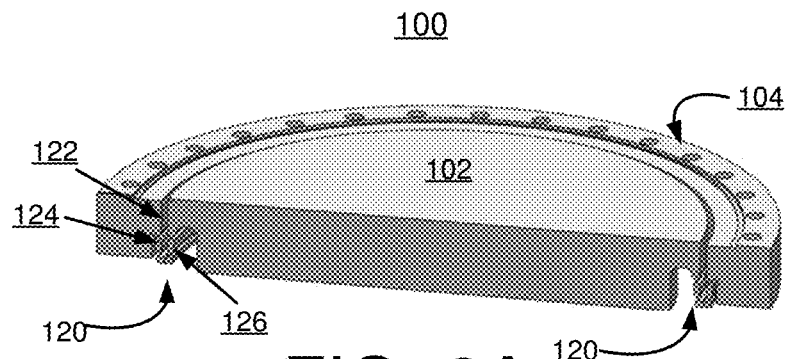
FIGS. 2A and 2B are partial sectional perspective views illustrating details of the flexure interface apparatus defining the UHV metrology base near-zero-length feedthrough of FIGS. 1A and 1B in accordance with a preferred embodiment.
Figure 2B:
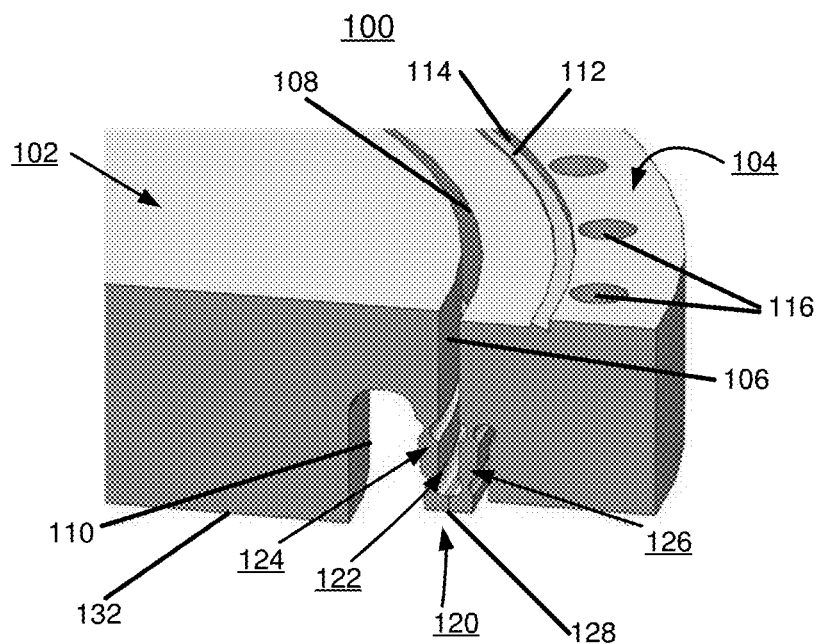

As shown in FIG. 1B, in FIGS. 2A and 2B, in accordance with features of the invention, a precision and compact flexure interface structure generally designated by the reference character 120 is provided by the UHV metrology base 102 integrated with the UHV flange 104, and together defining a UHV metrology base near-zero-length feedthrough 122. The precision and compact flexure interface structure 120 includes a flexure structure 124 formed in the UHV metrology base 102 and a flexure structure 126 formed in the UHV flange 104. The UHV metrology base 102 and UHV flange 104 are welded together at a welding interface surface 128 between the flexure structures 124 and 126. The UHV metrology base 102 and UHV flange 104 are welded together at 128, for example, by an electron-beam weld. The thickness of the UHV metrology base near-zero-length feedthrough 122 is only a few millimeters thicker than a regular 12" CF flange or UHV flange 104, and as a result called the near-zero-length feedthrough design.

The weld surface 128 is spaced above an air side mounting surface 132 of the UHV metrology base 102 by a few millimeters, such as in a range of 2-5 millimeters, providing the UHV metrology base near-zero-length feedthrough 122. The UHV metrology base near-zero-length feedthrough 122 provides a linkage between the air side and vacuum side of the UHV metrology base 102.

The precision and compact flexure interface structure 120 defining the UHV metrology base near-zero-length feedthrough 122 of the flexure interface apparatus 100 of the invention enables the ability to apply movement to the external surface 132 of the UHV metrology base 102 to reposition components on the vacuum chamber side with nanopositioning and thermal stability.

The precision and compact flexure interface structure 120 has both nanopositioning and thermal stability, as needed for the nanopositioning of x-ray optics in ultra-high-vacuum environment with limited space, especially for the cavity-based X-ray free electron laser systems. The compact flexure interface structure 120 is sufficiently strong to hold the vacuum force and sufficiently flexible to survive with the thermal expansion stress during bakeout process for UHV preparation.

Figure 3:
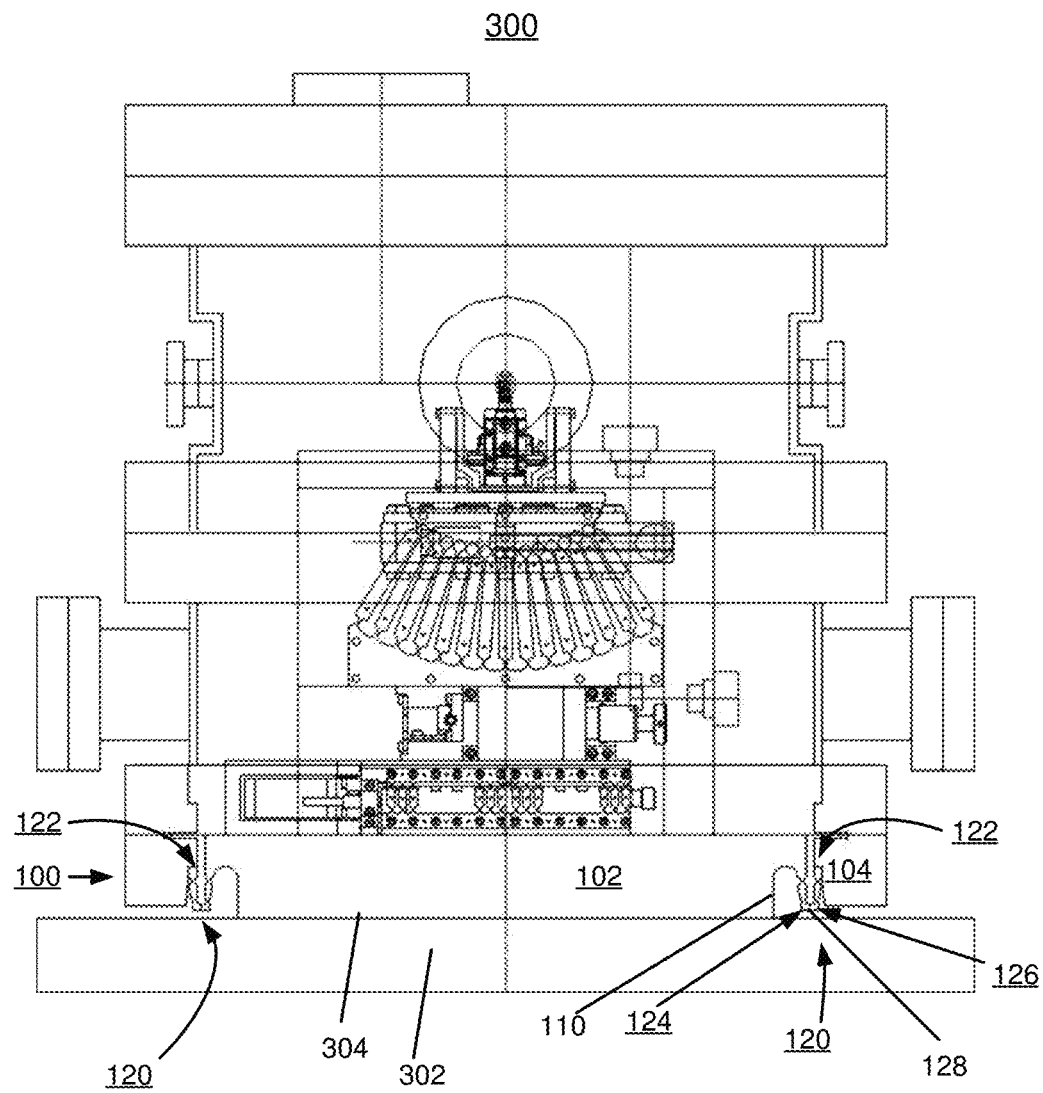
FIG. 3 schematically illustrates not to scale the flexure interface apparatus defining the UHV metrology base near-zero-length feedthrough applied on a diamond crystal nanopositioning station for cavity-based X-ray free electron laser application with multiple UHV nanopositioning stations in accordance with a preferred embodiment.

Referring now to FIG. 3, there is shown a diamond crystal nanopositioning station generally designated by the reference character 300 for cavity-based X-ray free electron laser applications. The precision and compact flexure interface structure 120 defining the UHV metrology base near-zero-length feedthrough 122 in accordance with a preferred embodiment is applied to the diamond crystal nanopositioning station 300. The flexure interface apparatus 100 is directly mounted on a mounting surface 304 of a common invar support mounting base 302, which can be used to link multiple UHV nanopositioning stations 300. The precision and compact flexure interface structure 120 with the UHV nanopositioning metrology base near-zero-length feedthrough 122 is spaced above the mounting surface 304 and enables mounting an UHV Invar metrology frame 102 directly to the Invar base 302 with nanopositioning and thermal stability, which is crucial for the nanopositioning of x-ray optics in ultra-high-vacuum environment with limited space. The weld surface 128 between the flexure structures 124 and 126 is spaced apart from the mounting surface 304 by a few millimeters, providing the Invar base near-zero-length feedthrough 122.

Figure 4:
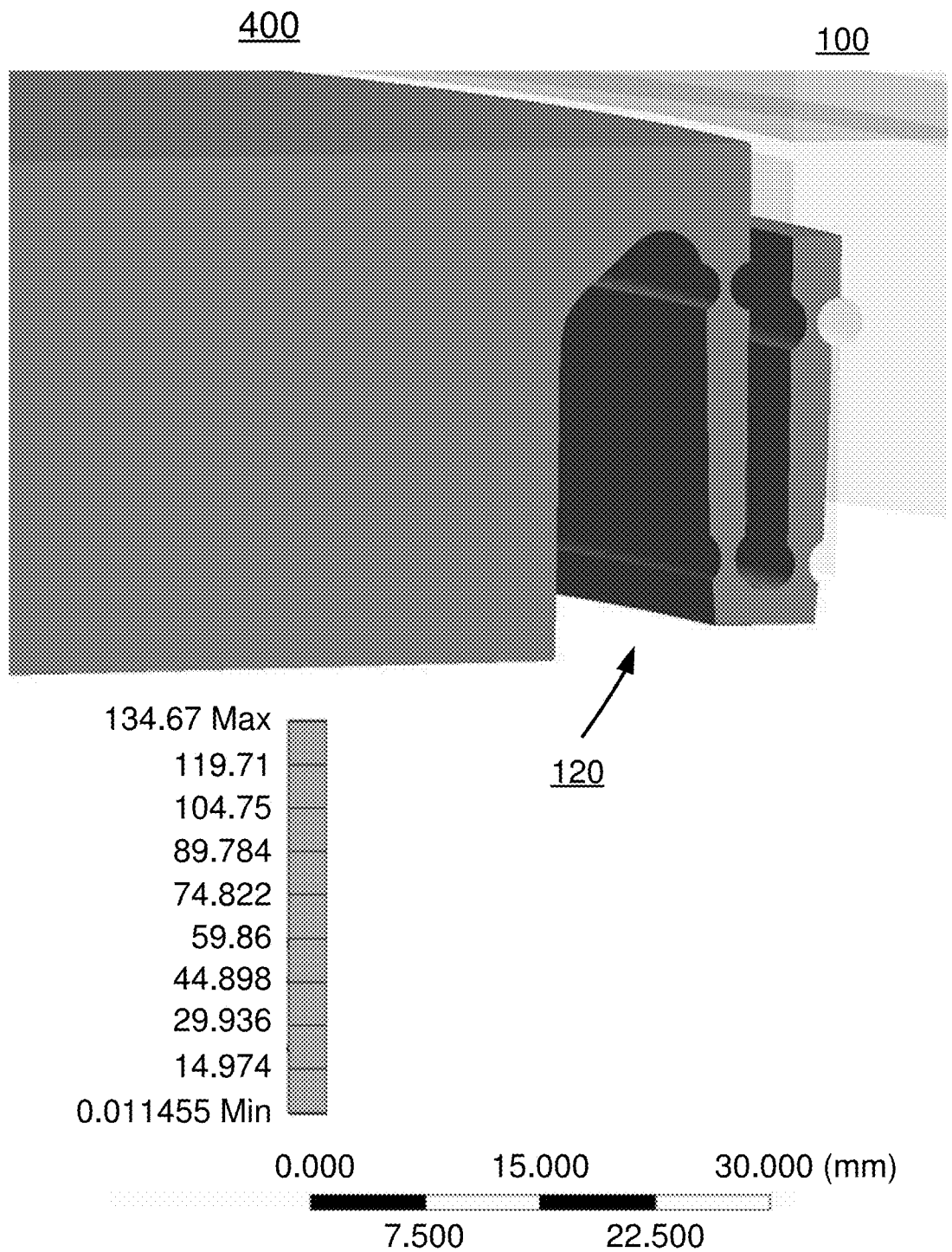
FIGS. 4, 5A, and 5B respectively illustrate a preliminary finite element analysis result of vacuum-force-induced Von Mises stress for the flexure interface apparatus for UHV nanopositioning metrology base near-zero-length feedthrough and a preliminary finite element analysis result of 60-degree Celsius thermal-induced and vacuum-force-induced Von Mises stress for the flexure interface apparatus for UHV nanopositioning metrology base near-zero-length feedthrough, with the UHV flange and flexure interface using 17-4 PH in FIGS. 4 and 5A, and the UHV flange using 304 SS and flexure using Inconel-600 in FIG. 5B, in accordance with preferred embodiments.
Figure 5A:
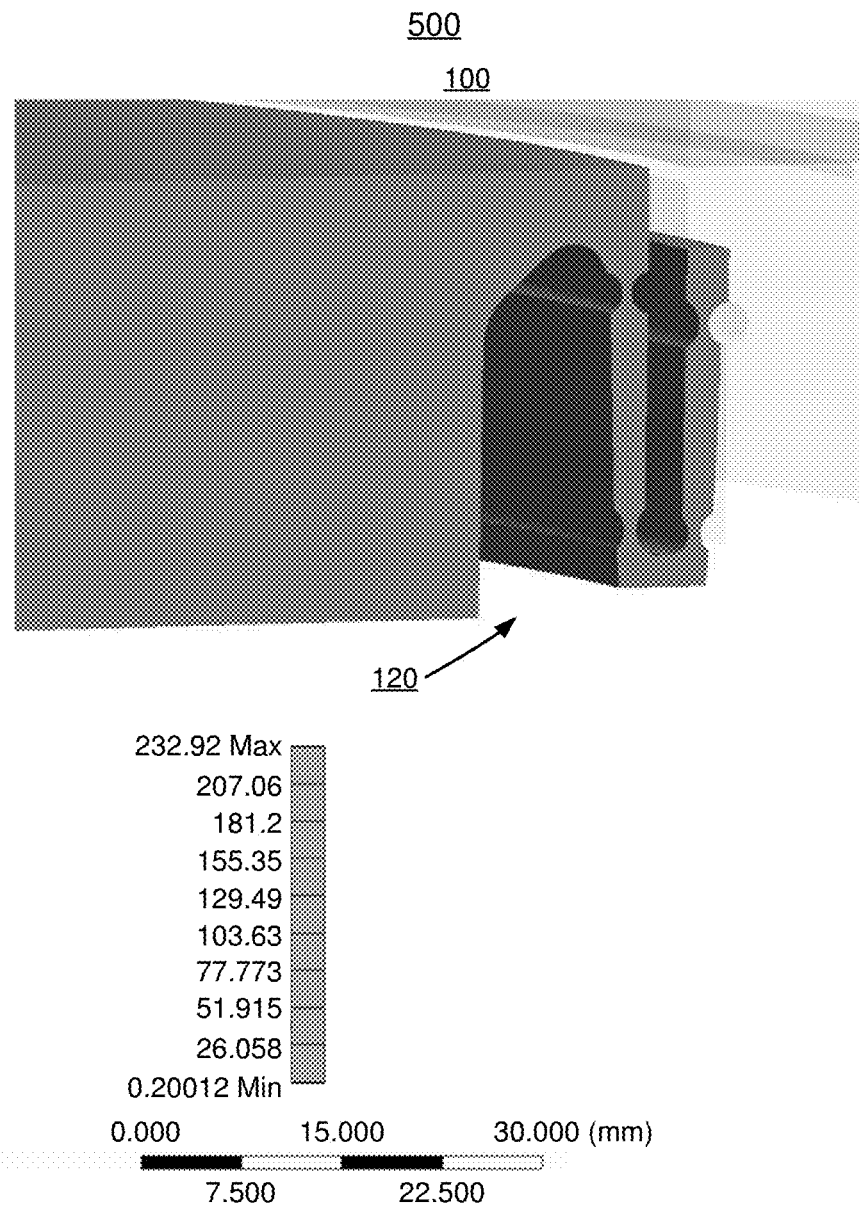
Figure 5B:
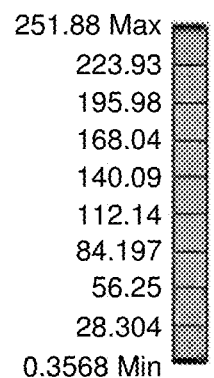
Figure 5B:
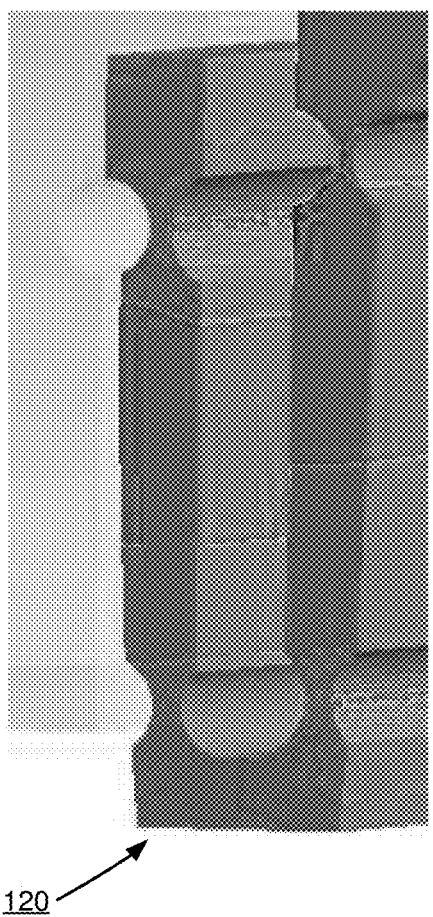
Figure 6A:
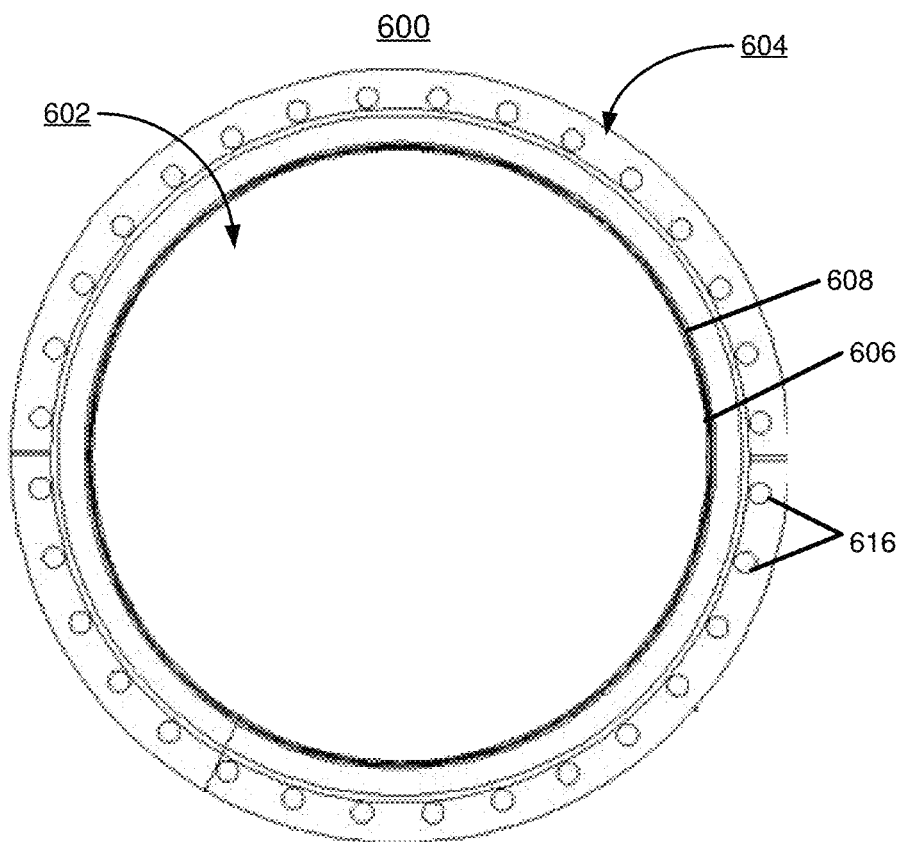
FIGS. 6A, 6B, 6C, and 6D schematically illustrate not to scale details of an Invar base feedthrough integrated with a modified commercially available 304 L UHV flange including an Inconel-600 flexure interface, or an alloy type known as 17-04 PH flexure interface incorporated in the flexure interface apparatus defining the UHV metrology base near-zero-length feedthrough of FIGS. 1A and 1B in accordance with a preferred embodiment.
Figure 6B:
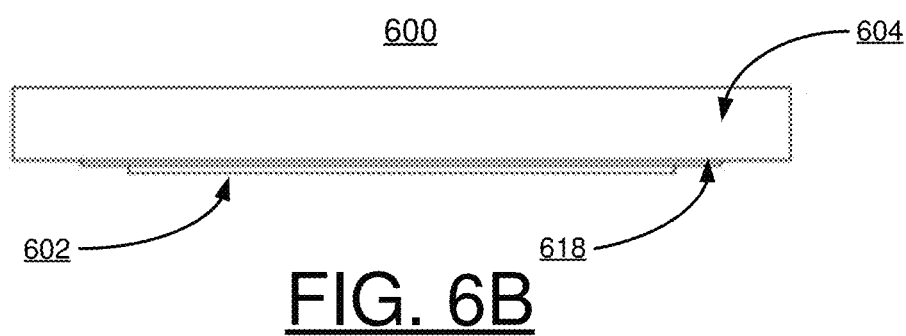
Figure 6C:
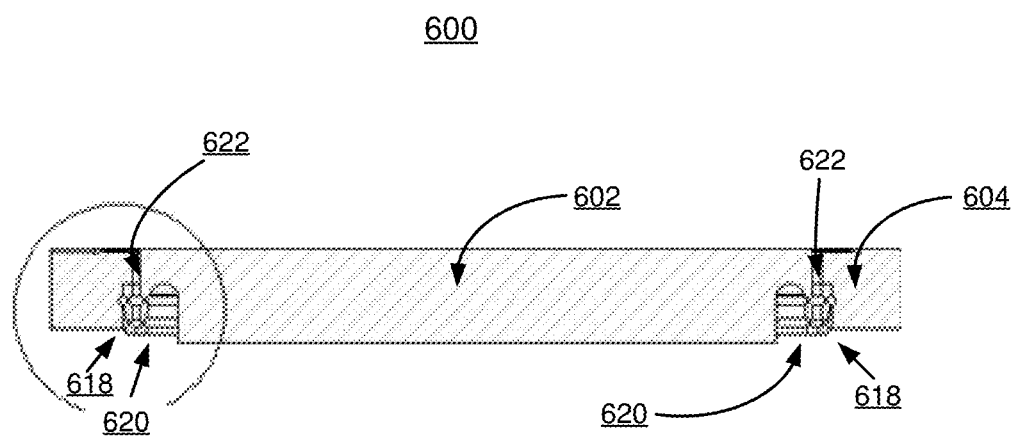
Figure 6D:
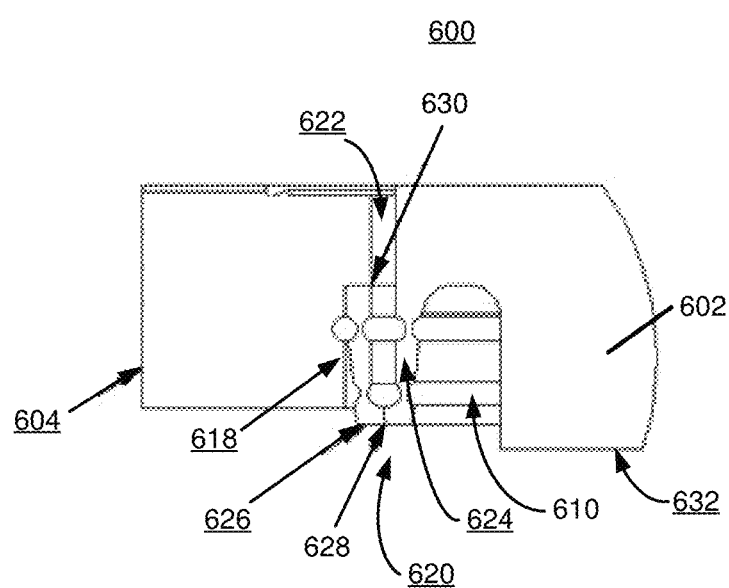

FIGS. 4, 5A, and 5B, respectively illustrate Von Mises stress results respectively generally designated by the reference character 400, 500, 510 for the precision and compact flexure interface structure 120 defining the UHV metrology base near-zero-length feedthrough 122. In FIG. 4, there is shown a preliminary finite element analysis result 400 of vacuum-force-induced Von Mises stress for the flexure interface apparatus 100 for UHV nanopositioning metrology base near-zero-length feedthrough 120. FIG. 5A illustrates a preliminary finite element analysis result 500 of 80-degree Celsius thermal-induced and vacuum-force-induced Von Mises stress for the precision and compact flexure interface structure 120 defining the UHV metrology base near-zero-length feedthrough 122. The results show that with Invar-36 base 102 and a 12" O.D. 17-4 PH stainless steel flange 104, the maximum Von-Mises stress is acceptable with good safety margins. As mechanical testing and the Von Mises stress results show, the compact flexure interface apparatus 100 with the UHV nanopositioning metrology base near-zero-length feedthrough 122 is strong enough to hold the vacuum force and flexible enough to survive with the thermal expansion stress during bakeout process with 80-100 degrees Celsius for UHV preparation. FIG. 5B shows that with Invar-36 base 102 and a 12" O.D. SS 304 L flange 104 and welded Inconel-600 flexure interface, the maximum Von-Mises stress is acceptable.

Referring to FIGS. 6A, 6B, 6C, and 6D, there is shown an integrated flexure interface apparatus generally designated by the reference character 600 for ultrahigh-vacuum (UHV) applications for precision nanopositioning systems. The flexure interface apparatus 600 includes an ultrahigh-vacuum (UHV) metrology base generally designated by the reference character 602 integrated with an UHV flange generally designated by the reference character 604 in accordance with a preferred embodiment. In the flexure interface apparatus 600, an Invar base feedthrough UHV metrology base 602 is integrated with a modified commercially available 304 L UHV flange 604 including a separate flexure interface 618 formed of an alloy type known as 17-4 PH or Inconel-600 incorporated in the flexure interface apparatus 600 defining the UHV metrology base near-zero-length feedthrough 622.

The flexure interface apparatus 600 is similar to the flexure interface apparatus 100. On the air base side, a groove or slot 610 extends around the UHV metrology base 602 near the UHV metrology base outer edge 606. The UHV flange 604 includes a narrow groove 612 extending around the UHV flange 604 with a machined CF flange knife-edge 614 used to form an effective leak-tight vacuum seal, and the UHV flange 104 includes a plurality of bolt-receiving openings 616.

The flexure interface apparatus 600 includes a precision and compact flexure interface structure 620 defining the UHV metrology base near-zero-length feedthrough 622. The precision and compact flexure interface structure 620 includes a flexure structure 624 formed in the UHV metrology base 602 and a flexure structure 626 formed in the separate flexure interface 618 mounted within the UHV flange 604. The UHV metrology Invar base 602 and the flexure structure 624 are welded together at a mounting interface surface 628 between the flexure structures 624 and 626, for example, by an electron-beam weld. The UHV metrology base 602 and UHV flange 604 are welded together at a mounting interface surface 630, for example, by an electron-beam weld or tungsten inert-gas (TIG) weld. The thickness of the UHV metrology base near-zero-length feedthrough 622 is only a few millimeters thicker than a regular 12" CF flange or UHV flange 604, providing the near-zero-length design. The weld surface 28 is spaced apart from an air side mounting surface 632 of the UHV metrology base 602 by a few millimeters, such as in a range of 2-5 millimeters. The UHV metrology base near-zero-length feedthrough 622 provides a linkage between the air side and vacuum side of the UHV metrology base 602. The precision and compact flexure interface structure 620 defining the UHV metrology base near-zero-length feedthrough 622 of the flexure interface apparatus 600 enables the ability to apply movement to the external surface 632 of the UHV metrology base 602 to reposition components on the vacuum chamber side with nanopositioning stability due to the novel flexure of the invention.

Figure 7A:
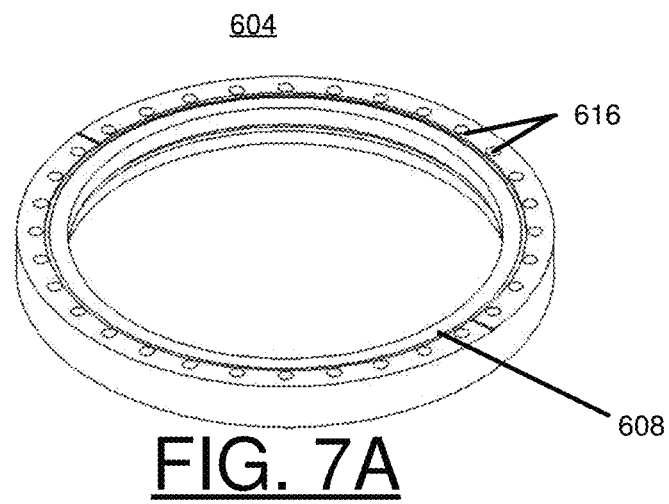
FIGS. 7A, 7B, and 7C schematically illustrate not to scale details of a modified commercially available 304 L UHV flange of the flexure interface apparatus defining the UHV metrology base near-zero-length feedthrough of FIGS. 6A, 6B, 6C, and 6D in accordance with a preferred embodiment.
Figure 7B:
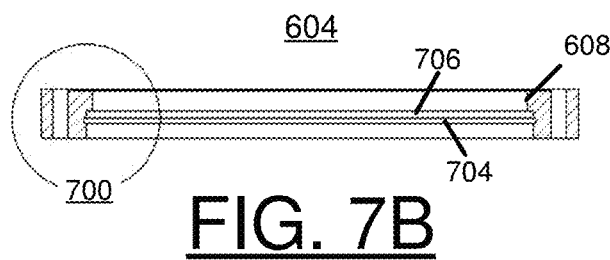
Figure 7C:
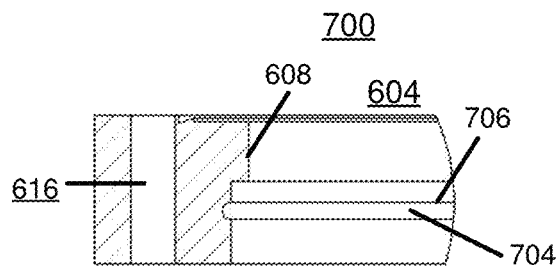

Referring now to FIGS. 7A, 7B, and 7C, there is shown the modified UHV flange 604 of the flexure interface apparatus 600 defining the UHV metrology base near-zero-length feedthrough 622 in accordance with a preferred embodiment. For example, the modified UHV flange 604 includes a 12" O.D. 304 stainless steel (SS) or 17-4 PH UHV flange receiving the alloy type Inconel-600 or 17-4 PH flexure interface 618, illustrated in FIGS. 8A, 8B, and 8C. As shown in detail 700 in FIGS. 7B, and 7C, the central opening 608 of the UHV flange 604 included a stepped wall portion defined by a pair of grooves 704, 706 extending around the central opening.

Figure 8A:
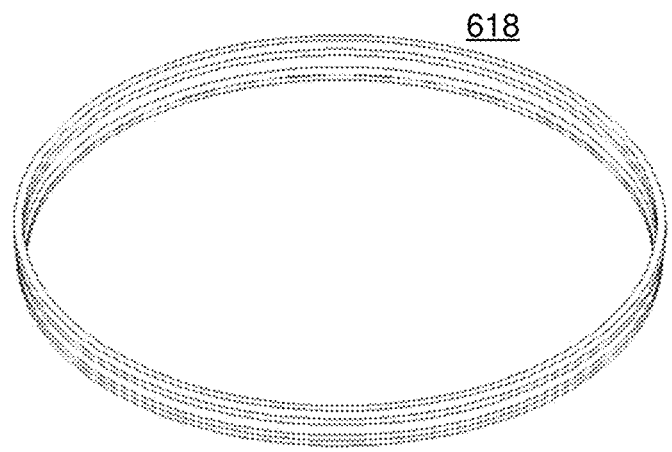
FIGS. 8A, 8B, and 8C schematically illustrate not to scale the Inconel-600 flexure interface, or alloy type known as 17-04 PH flexure interface incorporated with a UHV flange the flexure interface apparatus of FIGS. 6A, 6B, 6C, and 6D in accordance with a preferred embodiment.
Figure 8B:
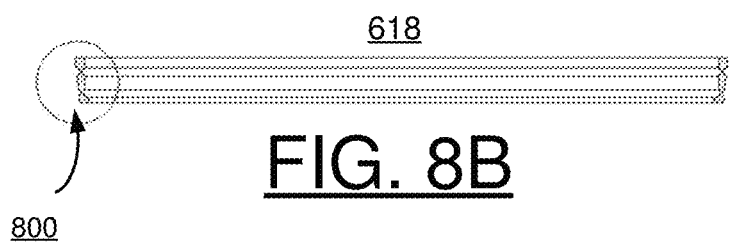
Figure 8C:
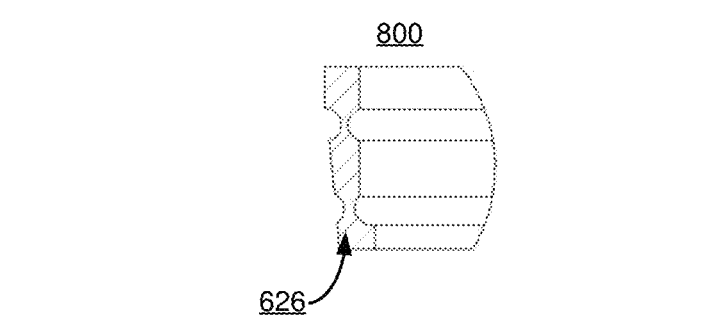

Referring now to FIGS. 8A, 8B, and 8C, there is shown the alloy type 17-4 PH flexure interface 618 or Inconel-600 flexure interface 618 integrated within the central opening 608 of the UHV flange 604 of the flexure interface apparatus 600 of FIGS. 6A, 6B, 6C, and 6D in accordance with a preferred embodiment. As shown in detail 800 in FIGS. 8B, and 8C, the flexure structure 626 Is formed in the separate flexure interface 618 mounted within the UHV flange 104.

Figure 9A:
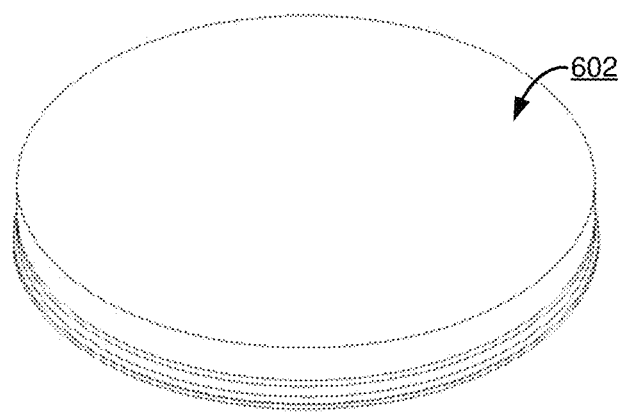
FIGS. 9A, 9B, and 9C schematically illustrate not to scale Invar base feedthrough of the flexure interface apparatus defining the UHV metrology base near-zero-length feedthrough of FIGS. 6A, 6B, 6C, and 6D in accordance with a preferred embodiment.
Figure 9B:
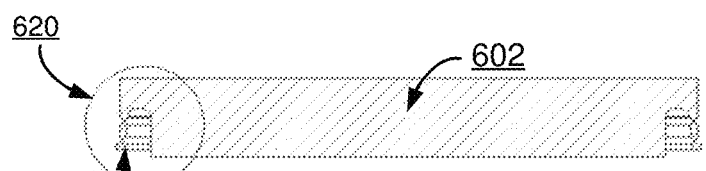
Figure 9C:
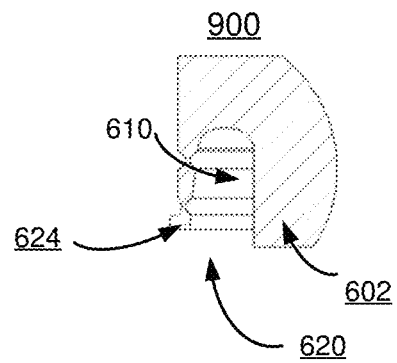

Referring to FIGS. 9A, 9B, and 9C, there is shown the Invar UHV metrology base 602 of the flexure interface apparatus 600 defining the UHV metrology base near-zero-length feedthrough 622 of FIGS. 6A, 6B, 6C, and 6D in accordance with a preferred embodiment. As shown in detail 900 in FIGS. 9B, and 9C, the flexure structure 624 of precision and compact flexure interface structure 620 defining the UHV metrology base near-zero-length feedthrough 622 is formed in the Invar UHV metrology base 602 proximate to the groove 610.

Figure 10:
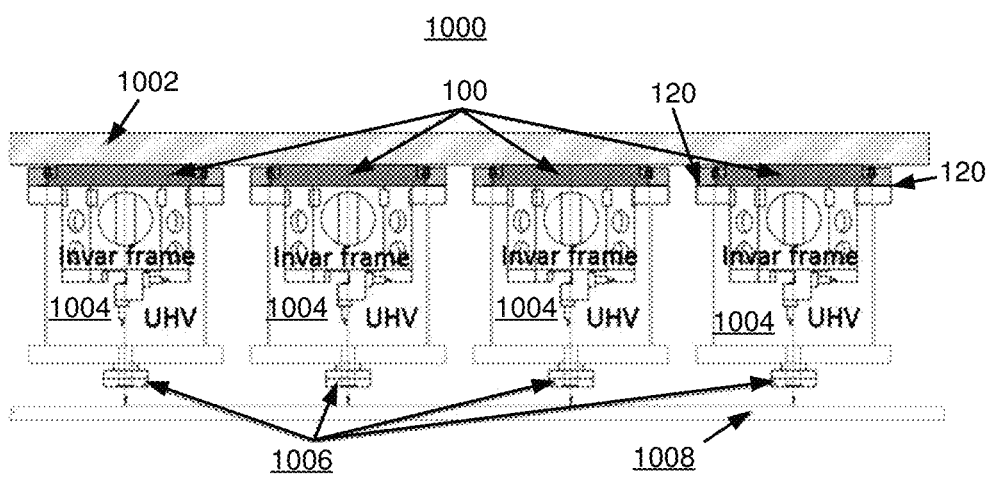
FIG. 10 schematically illustrates not to scale the flexure interface apparatus defining the UHV metrology base near-zero-length feedthrough for example application for multiple UHV chambers with nanopositioning instruments linked to an in-air Invar common base in accordance with a preferred embodiment.

Referring to FIG. 10, there is shown the flexure interface apparatus 100 defining the UHV metrology base near-zero-length feedthrough 120 for an example application of multiple UHV chambers generally designated by the reference character 1000 with nanopositioning instruments linked to an in-air Invar common support mounting base 1002 in accordance with a preferred embodiment.

Potential applications exist for various other industrial or scientific devices, where there is a need for an invar metrology linkage between air-side (or low-vacuum-side) and an UHV-side, especially with a common invar base, such as the in-air Invar common base 1002 linked into multiple individual vacuum space as a metrology reference base for positioning control in nanometer scale.

As shown in FIG. 10, the invar common support mounting base 1002 hosts numbers of beam generator operating in UHV condition and scanning by individual nanopositioning stages in each of the UHV chamber and closed-loop controlled with nanopositioning sensors mounted on each of the in-UHV invar frame. The flexure interface apparatus 100 defining the UHV metrology base near-zero-length feedthroughs 120 provide a UHV/air linkage between each of multiple in-UHV invar frames 1004 to the common base 1002. As shown, the integrated invar-based frames 1004 provide a stable metrology reference base for multiple micro/nano-beam delivery system windows 1006 to a production target 1008 with a large operation scale for semiconductor or nano-material industrial applications.

While the present invention has been described with reference to the details of the embodiments of the invention shown in the drawing, these details are not intended to limit the scope of the invention as claimed in the appended claims.

What is claimed is:

1. A flexure interface apparatus for ultrahigh-vacuum (UHV) applications for precision nanopositioning systems comprising:
an ultrahigh-vacuum (UHV) flange;
an ultrahigh-vacuum (UHV) metrology base integrated with said ultrahigh-vacuum (UHV) flange; said UHV metrology base directly mounted to a support mounting base surface in air with nanopositioning and thermal stability;
said UHV metrology base and said UHV flange cooperatively providing a precision and compact flexure interface structure defining a UHV metrology base near-zero-length feedthrough; and
said precision and compact flexure interface structure having sufficient strength to hold ultrahigh-vacuum force and sufficiently flexible to survive with thermal expansion stress during bakeout process.

2. A flexure interface apparatus as recited in claim 1 wherein said precision and compact flexure interface structure includes said UHV metrology base having a thickness greater than a thickness of said UHV flange by a selected value; said selected value in a range of 2-4 millimeters.

3. A flexure interface apparatus as recited in claim 1 wherein said UHV metrology base is formed of a nickel-iron alloy with a low coefficient of thermal expansion over a wide range of temperatures.

4. A flexure interface apparatus as recited in claim 2 wherein UHV metrology base is formed of an Invar nickel-iron alloy material.

5. A flexure interface apparatus as recited in claim 1 wherein UHV metrology base includes a fully annealed nickel-iron alloy material having predefined strength, machinability, and stability.

6. A flexure interface apparatus as recited in claim 1 said mounting surface includes a mounting base, said support mounting base is formed of a nickel-iron alloy with a low coefficient of thermal expansion over a wide range of temperatures including an Invar nickel-iron alloy material.

7. A flexure interface apparatus as recited in claim 1 wherein said flange is formed of stainless-steel material having high levels of strength and hardness, corrosion resistance, enhanced formability, and machinability.

8. A flexure interface apparatus as recited in claim 1 wherein said precision and compact flexure interface structure defining a UHV metrology base near-zero-length feedthrough includes a flexure structure formed in said UHV metrology base and a flexure structure formed in said UHV flange.

9. A flexure interface apparatus as recited in claim 8 wherein said flexure structures of said UHV metrology base and said UHV flange are welded together.

10. A flexure interface apparatus as recited in claim 9 includes a separate flexure interface integrated with said UHV flange, said separate flexure interface and said UHV flange welded together, and said flexure structure formed in said separate flexure interface.

11. A flexure interface apparatus as recited in claim 10 wherein said UHV flange is formed of a selected one of a stainless-steel (SS) 304 L UHV material and stainless-steel (SS) alloy type 17-4 PH and said integrated separate flexure interface is formed of a selected one of stainless-steel (SS) alloy type 17-4 PH and Inconel-600.

12. A flexure interface apparatus as recited in claim 10 wherein said flexure structure formed in said UHV metrology base is formed of a nickel-iron alloy Invar metrology base material.

13. A flexure interface apparatus as recited in claim 1 wherein a weld surface between a flexure structure formed in said UHV metrology base and a flexure structure formed in said UHV flange is spaced above an air side exterior surface of said UHV metrology base in a range of 2-5 millimeters.

14. A flexure interface apparatus as recited in claim 1 wherein a thickness of said UHV flange is greater than a thickness of said UHV flange in a set range of between 2- and 5 millimeters, providing the near-zero-length feedthrough design.

15. A flexure interface apparatus as recited in claim 1 wherein said precision and compact flexure interface structure defining a UHV metrology base near-zero-length feedthrough provides a linkage between an air side and a vacuum side of said UHV metrology base.

16. A method for implementing flexure interface apparatus for ultrahigh-vacuum (UHV) applications for precision nanopositioning systems comprising:
providing an ultrahigh-vacuum (UHV) flange;
integrating an ultrahigh-vacuum (UHV) metrology base with said ultrahigh-vacuum (UHV) flange;
directly mounting said UHV metrology base to a support mounting base surface in air with nanopositioning and thermal stability;
cooperatively providing a precision and compact flexure interface structure defining a UHV metrology base near-zero-length feedthrough with said UHV metrology base and said UHV flange; and
providing said precision and compact flexure interface structure with sufficient strength to hold ultrahigh-vacuum force and sufficiently flexible to survive with thermal expansion stress during bakeout process.

17. The method as recited in claim 16 wherein cooperatively providing a precision and compact flexure interface structure defining a UHV metrology base near-zero-length feedthrough includes forming a flexure structure in said UHV metrology base and a flexure structure formed with said UHV flange.

18. The method as recited in claim 17 includes welding together said flexure structures of said UHV metrology base and said UHV flange with an electron-beam weld.

19. The method as recited in claim 16 wherein providing an ultrahigh-vacuum (UHV) flange includes forming said UHV flange of a selected stainless-steel material.

20. The method as recited in claim 16 wherein integrating an ultrahigh-vacuum (UHV) metrology base with said ultrahigh-vacuum (UHV) flange includes forming said UHV metrology base of a nickel-iron alloy Invar metrology base material.

* * * * *